(12) United States Patent
Jemiolo et al.

(10) Patent No.: US 10,175,999 B2
(45) Date of Patent: Jan. 8, 2019

(54) CONVERTING VIDEO INTO A WALKTHROUGH FOR AN APPLICATION OR AN ONLINE SERVICE

(71) Applicant: salesforce.com, inc., San Francisco, CA (US)

(72) Inventors: Daniel Everett Jemiolo, Cary, NC (US); Jason Wagner, Raleigh, NC (US); Michael Burr, Cary, NC (US)

(73) Assignee: salesforce.com, inc., San Francisco, CA (US)

( * ) Notice: Subject to any disclaimer, the term of this patent is extended or adjusted under 35 U.S.C. 154(b) by 314 days.

(21) Appl. No.: 14/630,974

(22) Filed: Feb. 25, 2015

(65) Prior Publication Data

US 2016/0246615 A1 Aug. 25, 2016

(51) Int. Cl.
*G06F 9/451* (2018.01)
*G06F 17/30* (2006.01)
(Continued)

(52) U.S. Cl.
CPC .......... *G06F 9/453* (2018.02); *G06F 17/3079* (2013.01); *G06K 9/00765* (2013.01);
(Continued)

(58) Field of Classification Search
USPC .......... 434/31, 118; 709/203, 204, 205, 219, 709/231; 715/229, 230, 730, 712, 240
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

U.S. Appl. No. 14/606,855, filed Jan. 27, 2015, Jemiolo, Daniel E.
(Continued)

*Primary Examiner* — Doon Y Chow
*Assistant Examiner* — Wendy Nicholas
(74) *Attorney, Agent, or Firm* — Weaver Austin Villeneuve & Sampson LLP

(57) ABSTRACT

Disclosed are examples of systems, apparatus, methods and computer program products for converting video into a walkthrough for an application or an online service. For example, a database storing data objects identifying walkthrough stages can be maintained. Each walkthrough stage can be associated with one or more features of an application or a service. Video comprising a plurality of frames can be received. A spatial region of one or more of the frames can be matched to a graphical component of the application or the service to produce a mapping. One or more of the frames can be processed using the mapping to determine that an update to a user interface (UI) displayed on a computing device has occurred. One or more walkthrough stages stored in the database can be identified based on the mapping. The one or more identified walkthrough stages can be assigned to a walkthrough. The walkthrough can be stored as a data file in a database of a database system. The walkthrough can be configured to be accessed via the data network and interacted with using the computing device.

20 Claims, 7 Drawing Sheets

(51) Int. Cl.
*G11B 27/11* (2006.01)
*G11B 27/10* (2006.01)
*G06K 9/00* (2006.01)
*G06K 9/62* (2006.01)

(52) U.S. Cl.
CPC .......... *G06K 9/6202* (2013.01); *G11B 27/102* (2013.01); *G11B 27/11* (2013.01); *G06K 2209/01* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,753,703 B2 | 9/2017 | Jemiolo |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |

(56) References Cited

U.S. PATENT DOCUMENTS

| | | |
|---|---|---|
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0036715 A1* | 2/2004 | Warren .................. G06F 9/453 715/713 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei |
| 2005/0050555 A1 | 3/2005 | Exley et al. |
| 2005/0091098 A1 | 4/2005 | Brodersen et al. |
| 2007/0015118 A1* | 1/2007 | Nickell .................. G09B 7/02 434/118 |
| 2008/0160492 A1* | 7/2008 | Campbell ................ G09B 5/06 434/379 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0259745 A1* | 10/2009 | Lee ....................... G06K 9/2072 709/224 |
| 2010/0138775 A1* | 6/2010 | Kohen .................. G06F 9/4443 715/781 |
| 2011/0067099 A1* | 3/2011 | Barton ................ G06Q 30/0244 726/21 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0167001 A1* | 6/2012 | Ortiz ..................... G06F 3/005 715/781 |
| 2012/0198362 A1* | 8/2012 | Urban ................ G06K 9/00476 715/762 |
| 2012/0233137 A1 | 9/2012 | Jakobson et al. |
| 2012/0290407 A1 | 11/2012 | Hubbard et al. |
| 2013/0129316 A1* | 5/2013 | Dontcheva ............... H04N 5/76 386/241 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0298162 A1* | 10/2014 | Cohen ..................... G09B 5/02 715/234 |
| 2014/0359537 A1 | 12/2014 | Jakobson et al. |
| 2014/0365203 A1* | 12/2014 | Waibel ................... G06F 17/24 704/2 |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0234571 A1* | 8/2015 | Lee ....................... G06F 3/0488 715/721 |
| 2015/0365725 A1* | 12/2015 | Belyaev ................ H04N 21/458 725/46 |
| 2016/0140503 A1 | 5/2016 | Jemiolo |
| 2016/0225371 A1* | 8/2016 | Agrawal ............. G06F 3/04842 |

OTHER PUBLICATIONS

U.S. Appl. No. 14/546,965, filed Nov. 18, 2014, Jemiolo, Daniel E.

"Google Plus Users", Google+Ripples, Oct. 31, 2011 [retrieved on Feb. 21, 2012 from Internet at http://www.googleplusers.com/google-ripples.html], 3 pages.

* cited by examiner

CONVERTING VIDEO INTO A WALKTHROUGH FOR AN APPLICATION OR AN ONLINE SERVICE

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to walkthroughs for applications or online services. More specifically, this patent document discloses techniques for converting video into a walkthrough for an application or an online service.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for converting video into a walkthrough for an application or an online service. These drawings in no way limit any changes in form and detail that may be made by one skilled in the art without departing from the spirit and scope of the disclosed implementations.

DETAILED DESCRIPTION

Figure 1:
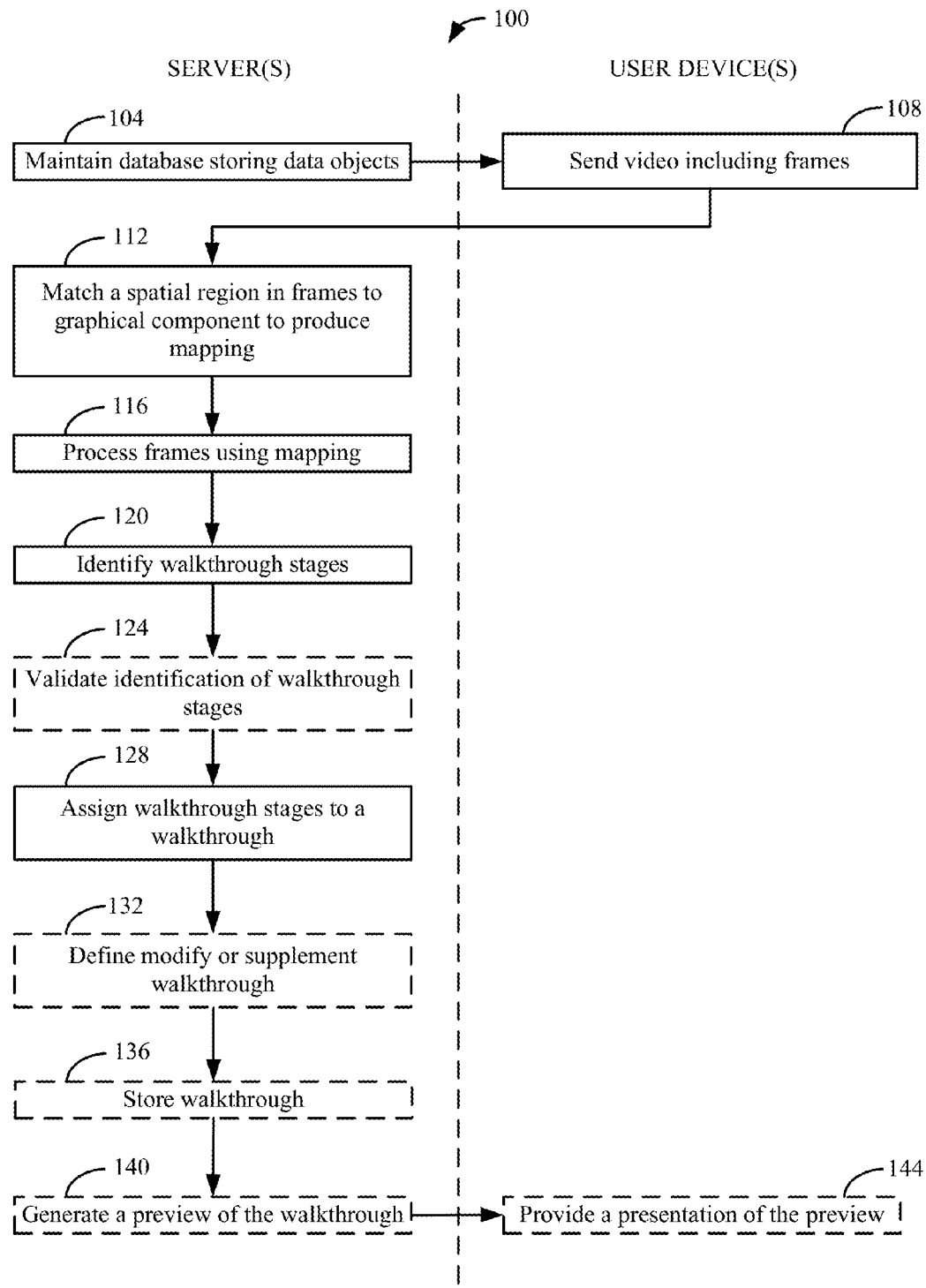
FIG. 1 shows a flowchart of an example of a method 100 for converting video into a walkthrough for an application or an online service, performed in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for converting video, such as a screencast, into a walkthrough for an application or an online service. The term screencast as used herein generally refers to a live stream or video file containing successive frames such as screen shots of activity in a User Interface (UI) of a computing device, as discussed further below. The concept of walkthroughs as discussed herein encompasses a range of subject matter. A walkthrough generally refers to an interactive presentation for training a user to use any computing application or online service such as, but not limited to, a cloud-based enterprise application. In some implementations, a walkthrough can be provided using a server-based database system to deliver hands-on training to employees, customers, or other individuals at their computing devices. By way of illustration, such hands-on training can merge interactive e-learning tutorials with guided exercises within the same training application.

In contrast to interactive walkthroughs, traditional screencasts have a number of drawbacks. For instance, screencasts can quickly become out of date and can be difficult to modify. In other words, since a screencast can be a series of difficult-to-edit screen shots, if the look or feel of a User Interface (UI) of an application changes, a screencast demonstrating the application may appear out of date or be rendered inaccurate. Additionally, an end user might download a potentially large video to watch a screencast. Screencasts can also be passive in that a user can view a screencast to watch tasks being executed, but does not get the experience of actually executing such tasks, potentially allowing parts of the screencast to be skipped or forgotten.

While screencasts can be generated relatively easily using readily available software such as QuickTime®, some conventional techniques involve manually generating interactive and editable walkthroughs. By way of example, Miranda is the Chief Executive Officer (CEO) of Tempest Freight, a small shipping business that is about to unveil a new online platform. Tempest Freight does not have the resources or staff to manually generate walkthroughs to train their employees and customers to use each of the thousands of new features of the online platform.

Some of the disclosed techniques can be used to leverage the relative ease of generating screencasts and avoid the aforementioned disadvantages of screencasts by automatically converting a screencast into an interactive walkthrough. By way of illustration, Prospero is a software developer at Tempest Freight working on the new online platform. Prospero uses QuickTime® to record a screencast while he logs in to the Tempest Freight online platform. A database system can automatically identify UI updates in the screencast, as described in further detail below. As used herein, a "UI update" refers to a change that occurs in the UI of an application or service such as an alteration of a page in a web application. The database system can access a database containing Tempest Freight's previously generated walkthrough stages, to identify walkthrough stages for each UI update. As used herein, the term "walkthrough stage" refers to a segment or portion of a walkthrough, as described in greater detail below. Walkthrough stages identified for each UI update in Prospero's screencast can be assigned to a "login walkthrough" that is then stored in a database, as described in further detail below.

In some implementations, once a screencast is automatically converted to a walkthrough, a preview of the walkthrough can be presented to a user for validation by the user. By way of example, a preview of the login walkthrough described in the preceding paragraph can be provided in a presentation on Prospero's computing device. Prospero can then validate or edit the walkthrough. For instance, Prospero might want to supplement the login walkthrough with text in several languages to make the walkthrough more accessible to international clients.

Figure 2:
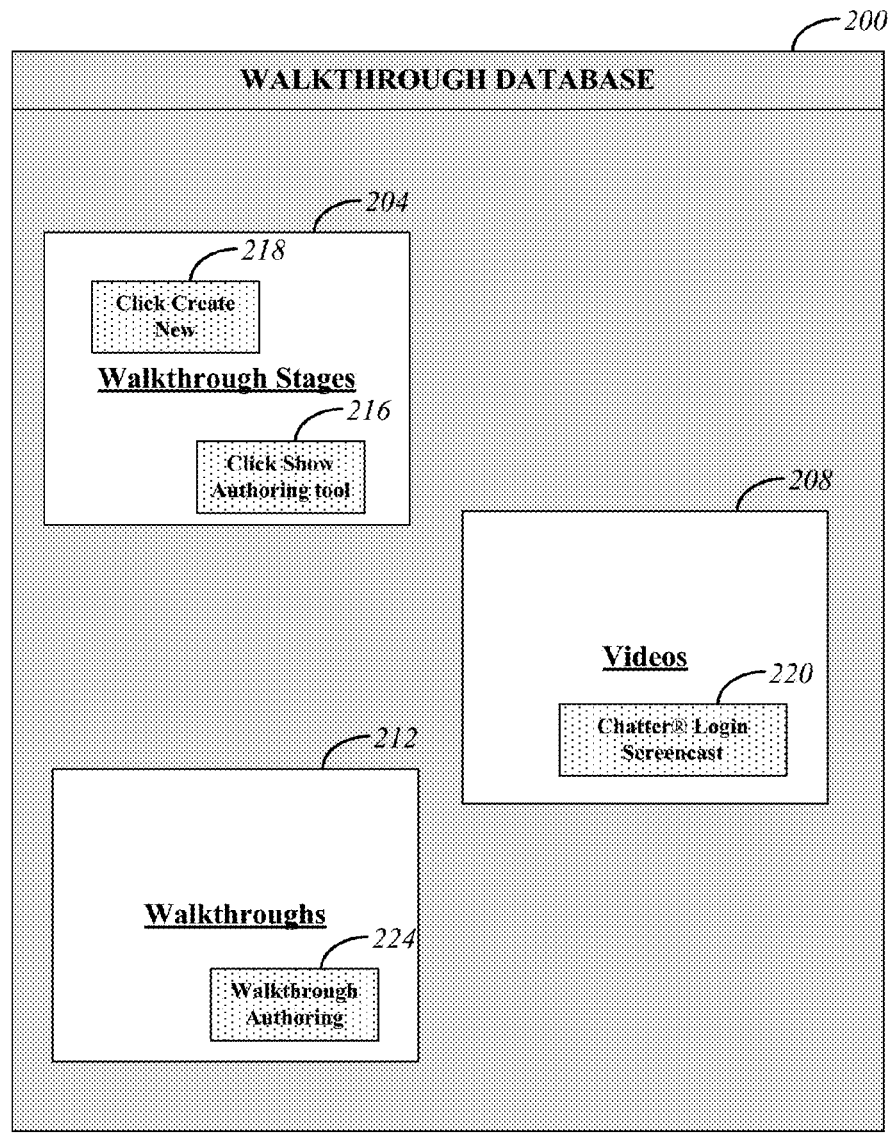
FIG. 2 shows a block diagram of an example of a Walkthrough Database 200, in accordance with some implementations.
Figure 3A:
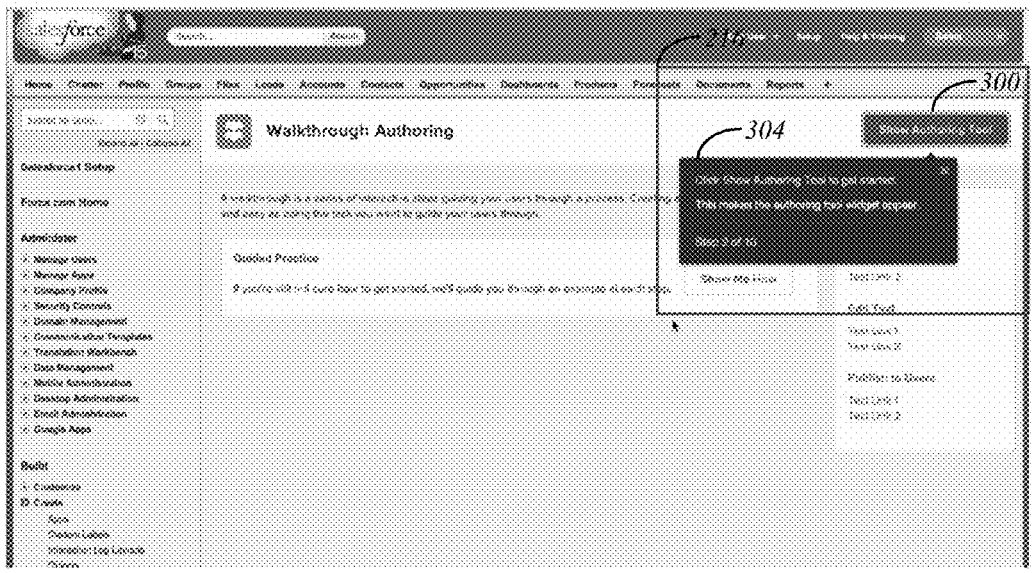
FIGS. 3A and 3B show examples of presentations of walkthrough stages in the form of graphical user interfaces (GUIs) as displayed on a computing device, in accordance with some implementations.
Figure 3B:
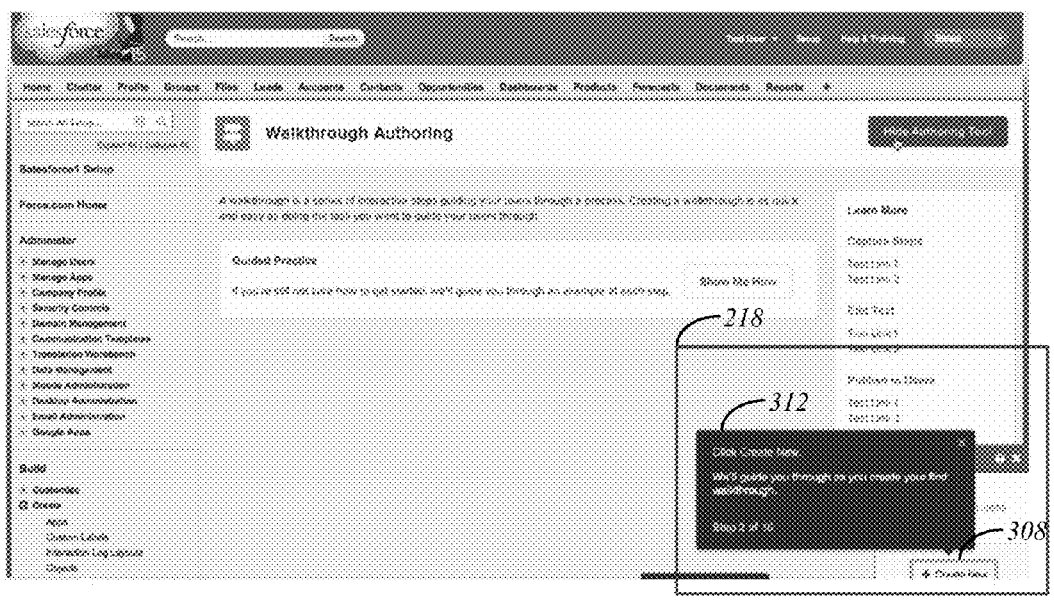
Figure 4A:
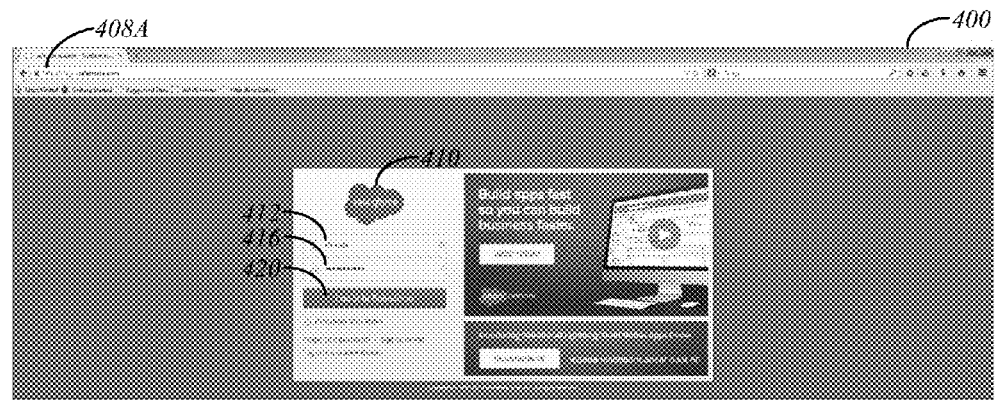
FIGS. 4A and 4B show examples of frames of a video as displayed on a computing device, in accordance with some implementations.
Figure 4B:
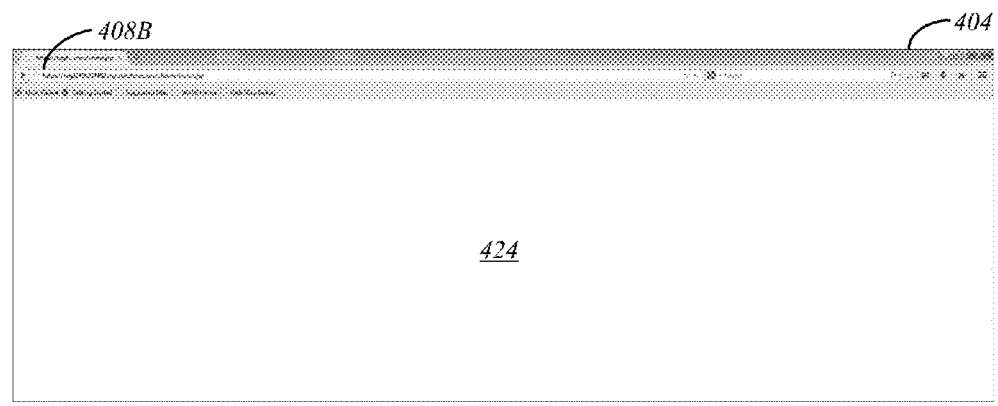

FIG. 1 shows a flowchart of an example of a method 100 for converting video into a walkthrough for an application or an online service, performed in accordance with some implementations. FIG. 1 is described with reference to FIGS. 2-4B. FIG. 2 shows a block diagram of an example of a Walkthrough Database 200, in accordance with some implementations. FIGS. 3A and 3B show examples of presentations of walkthrough stages in the form of graphical user interfaces (GUIs) as displayed on a computing device, in accordance with some implementations. FIGS. 4A and 4B show examples of frames of a video as displayed on a computing device, in accordance with some implementations.

At 104 of FIG. 1, Walkthrough Database 200 of FIG. 2 is maintained. Walkthrough Database 200 can be maintained by servers on behalf of an organization such as Tempest Freight, by a third party such as Salesforce.com®, or both. For example, Walkthrough Database 200 can form part of a database system 16 of FIGS. 5A and 5B. In some cases, walkthrough data can be stored in tenant data storage 22, described in greater detail below. Walkthrough Database 200 can store a wide variety of customizable data objects. For example, in FIG. 2, some data objects in Walkthrough Database 200 might identify walkthrough stages 204. Walkthrough stages 204, which are segments or portions of a walkthrough, can contain both pre-defined walkthrough stages and user-defined walkthrough stages. Specific types of walkthrough stages can vary across implementations. For instance, Click Show Authoring Tool 216 is an example of a walkthrough stage that demonstrates how and when to click or tap Show Authoring Tool Button 300 of FIG. 3A as part of the Walkthrough Authoring 224 walkthrough, as described in more detail below. Click Create New 218, which demonstrates how and when to click or tap Create New Button 308 of FIG. 3B as part of the Walkthrough Authoring 224 walkthrough is another example of a walkthrough stage 204 stored in Walkthrough Database 200.

A walkthrough stage can be defined by a variety of data, such as a target, a label, start and/or completion criteria, etc., which can be stored in Walkthrough Database 200. By way of illustration, Click Show Authoring Tool 216 targets Show Authoring Tool Button 300 of FIG. 3. Additionally, Click Show Authoring Tool 216 is labeled by text box 304. Also or alternatively, a walkthrough stage can be defined by start criteria, which specify the conditions under which a walkthrough stage is displayed, and completion criteria, which specify when the stage is not displayed. By way of illustration, Click Show Authoring Tool 216 is the second walkthrough stage in the Walkthrough Authoring 224 Walkthrough; therefore, the start criterion for Click Show Authoring Tool 216 is met when the preceding stage in the Walkthrough Authoring 224 walkthrough is completed. The completion criterion for Click Show Authoring Tool 216 can be met when its target, Show Authoring Tool Button 304, is clicked or tapped by a user. Along the same lines, the walkthrough stage Click Create New 218, targets Create New Button 308 and is labeled by text box 312. Since Click Create New 218 is immediately preceded by Click Show Authoring Tool 216 in Walkthrough Authoring 224, the completion criterion for Click Show Authoring Tool 216 is the start criterion for Click Create New 218. In other words, Click Create New 218 begins when Click Show Authoring Tool 216 is completed. The completion criterion for Click Create New 218 can be met when Create New Button 308 is clicked or tapped by a user.

Returning to FIG. 2, as discussed above, some data objects in Walkthrough Database 200 can identify videos 208, such as screencasts. Such videos can vary greatly across implementations and are described in further detail below. For example, a screencast might demonstrate the use of a variety of features of a web application such as record types, tabs buttons, fields, etc. By way of example, Walkthrough Database 200 can contain Chatter® Login Screencast 220, which is a screencast demonstrating the process of logging into Chatter®, an online social networking system provided by Salesforce.com®. Also or alternatively, a screencast might demonstrate features relating to Customer Relationship Management (CRM) records, such as an account, a task, a lead, a contact, a contract or an opportunity, or another type of data object.

In some implementations, some data objects in Walkthrough Database 200 might also identify walkthroughs 212 such as Walkthrough Authoring 224. Walkthrough Authoring 224 is a walkthrough demonstrating how to author walkthroughs.

Returning to FIG. 1, at 108, video, in the form of Chatter® Login Screencast 220 and containing frames 400 and 404 of FIGS. 4A and 4B, is received at a server (or servers) of a database system. Such video can include any number of frames and can be in the form of a file such as a Windows Media Video (WMV) file, an Audio Video Interleave (AVI) file, a Moving Picture Experts Group (MPEG) file, a QuickTime® Movie (MOV) file, etc.

Also or alternatively, such video can be in the form of a live stream capturing real-time or near real-time activity occurring in a UI on a computing device. By way of example, data can be streamed over the internet from Miranda's computer as she logs into Chatter® to a server to produce Chatter® Login Screencast 220. For instance, successive screenshots might be obtained from Miranda's computing device as she enters text in Name Field 412 and Password Field 416 of FIG. 4A.

In some implementations, a view port size of a browser window or screen resolution of a computing device can be converted to a designated size or value such that video generated by the computing device can be processed more easily, as described further below. For instance, returning to the example of the preceding paragraph, a database system can send a signal to Miranda's computing device causing the screen resolution of her computing device to be converted to 1,920 pixels by 1,200 pixels or a message requesting that Miranda convert her screen resolution to 1,920 pixels by 1,200 pixels. Also or alternatively, a presentation notifying a user of the designated viewport size can be displayed on the user's computing device. By way of illustration, a presentation of a rectangle enclosed by a dotted line can be displayed on Miranda's computer, indicating a designated space. Miranda can resize the viewport of her browser window such that the viewport of her browser window occupies the designated space.

In some implementations, video received at 108 can include an audio portion. By way of example, Miranda might use QuickTime® to record Chatter® Login Screencast 220 of FIG. 2. Miranda might speak into her computer's microphone describing what she is doing as she records Chatter® Login Screencast 220. Miranda's speech can be streamed live, captured in a video file such as those formats described above, or captured in a separate audio file such as an Moving Picture Experts Group Audio Part 3 (MP3) file, a Waveform (WAV) audio file, a Windows® Media Audio (WMA) file, etc.

At 112 or FIG. 1, a spatial region, such as Address Bars 408A in frame 400 of FIG. 4A, is matched to a graphical component of an application or service to produce a mapping. Matching a spatial region of a frame to a graphical component can be done in a variety of manners. For example, spatial regions in frames of a video can be matched with graphical components, such as an address bar, a field, a button, a dropdown menu, etc., in the Document Object Model (DOM) of a web application. Accordingly, a database system can analyze relative positioning between spatial regions in frames of a video and reconcile such regions with graphical components on a page of a web application. For example, using techniques discussed above, positioning between spatial regions in a frame of a screencast can by normalized by resizing a user's viewport of a browser to a designated size and/or her screen resolution to a specific value before she begins recording a screencast. Since a database system can store and access data indicating expected relative positions of graphical components of a web application, such normalization can allow the database system to identify graphical components, such as Company Logo 410, and Address Bar 408A of FIG. 4A, based on their relative positioning. As such, a mapping of spatial regions of a frame to graphical components of an application or service can be produced.

At 116, frames 400 and 404 of FIGS. 4A and 4B are processed, using the mapping produced at 112, to determine that a UI update has occurred. The processing of frames and the identification of such a UI update can vary across implementations. For example, a database system might determine that a UI update has occurred based on identifying a change of a Uniform Resource Locator (URL) in an address bar of a web browser. By way of illustration, frame 400 of FIG. 4A can be processed by extracting text from Address Bar 408A using standard Optical Character Recognition (OCR) techniques. Address Bar 408A can be identified as an address bar of a web browser based on the mapping produced at 112 of FIG. 1. Similarly, frame 404 of FIG. 4B can be processed by extracting text from Address Bar 408B using standard Optical Character Recognition (OCR) techniques. Address Bar 408B can also be identified as an address bar of a web browser based on the mapping produced at 112 of FIG. 1. The text in Address Bar 408A and the text in Address Bar 408B can be parsed by a database system and compared to determine a difference between the text in Address Bars 408A and 408B. As such, a database system can determine based on the differing text of Address Bars 408A and 408B that a UI update has occurred.

Also or alternatively, a database system can determine that a UI update has occurred by detecting data entry in a spatial region of a frame that is matched to a field of an application based on the mapping produced at 112 of FIG. 1. By way of example, if a database system detects entry of text in Name Field 412 and Password Field 416 of FIG. 4A the database system can determine that a UI update has occurred.

In some implementations, a database system can determine that a UI update has occurred by identifying blank content in a frame (or frames) of a video. For example, when a second page in a web application is loaded after first page, the second page might be preceded by a blank page in a browser window as the second page is loading. By way of illustration, a UI update can be identified between frames 400 and 404 because content 424 within frame 404 is blank.

Also or alternatively, movement of a cursor over a spatial region in a frame can be monitored based on the mapping produced at 112 of FIG. 1 to determine that a UI update has occurred or will occur. For example, a mouse click in proximity to a graphical component of a web application may indicate a UI update. Such a mouse click can be preceded by a number of identifiable indicators. For instance, mouse clicks can occur after mouse cursor movement slows and pauses briefly over graphical component such as a photo, button, hyperlink, or dropdown menu. Additionally, when a mouse click occurs, a graphical component such as a button might change its appearance to signify that it was clicked. Therefore, by analyzing the differences between neighboring frames, a database system can identify mouse clicks. By way of illustration, if a mouse cursor moves to Login Button 420 of FIG. 4A and is stationary over Login Button 420, a database system can determine that Login Button 420 has been or will be clicked causing a UI update to occur. Additionally, if a database system detects that Login Button 420 is in a depressed state, this can be a further signal of an impending UI update.

Returning to FIG. 1, at 120, walkthrough stages stored in the Walkthrough Database 200 of FIG. 2 are identified based on the UI update. For instance, Walkthrough Database 200 can identify designated relationships between UI updates and walkthrough stages. By way of illustration, Walkthrough Stage Z targets Name Field 412 of FIG. 4A and is labeled by text indicating that a user should begin entering text into Name Field 412. Similarly, UI Update Z occurs when data entry in Name Field 412 is detected. Additionally, Walkthrough Database 200 identifies a designated relationship between UI Update Z and Walkthrough Stage Z. Thus, a database system can identify Walkthrough Stage Z based on the occurrence of UI update Z.

In some implementations, a UI update that involves a URL change can be used by a database system to identify walkthrough stages relating to the URL change. By way of illustration, during a UI update, a URL in an address bar of a browser window changes from " . . . /page/contact/new" to " . . . /page/contact/123." The text of these URLs can be parsed by a database system and compared to determine that a new contact has been created. Thus, based on the UI update, the database system can identify walkthrough stages stored in Walkthrough Database 200 relating to creation of new contacts.

In some implementations, at 124, the identification of walkthrough stages is validated using an audio portion of a video. By way of example, Miranda narrates Chatter® Login Screencast 220 of FIG. 2, as discussed above. In her narration Miranda states: "Next enter your name in the name field," before she enters text into Name Field 412 of FIG. 4A. Such audio can be processed using standard Automatic Speech Recognition (ASR) techniques to produce a textual string. Such text can be parsed and compared to designated keywords stored in a database to verify a walkthrough stage. For instance, the text "name field" might be used to verify Walkthrough Stage Z's target of Name Field 412.

At 128 the identified walkthrough stages are assigned to a walkthrough. The walkthrough stages can be assigned to an existing walkthrough such as the Walkthrough Authoring 224 walkthrough of FIG. 2. Also or alternatively, a new walkthrough can be generated at 128 and the identified walkthrough stages can be assigned to the newly generated walkthrough.

At 132, in some but not all implementations, the walkthrough can be defined based on an audio portion of a video. By way of example, Miranda might begin her narration of the Chatter® Login Screencast 220 of FIG. 2 by stating "I will be performing a walkthrough of logging into Chatter®." As discussed above, standard ASR techniques can be applied to Miranda's narration and to produce a textual string. The textual string can be parsed and elements of the string can be used to define the walkthrough. For example, the walkthrough might be defined by the name "a walkthrough of logging into Chatter®."

Also or alternatively, at 132, the walkthrough can be supplemented or modified based on such audio. For instance, text in a text box labeling a walkthrough stage can be modified or supplemented to include elements of the audio. By way of illustration, in Miranda's narration of the Chatter® Login Screencast 220 of FIG. 2, she might refer to Password Field 416 of FIG. 4A as the "security credential entry area." Using ASR and parsing techniques described above, a database system can replace the default text "password field" labeling walkthrough stages targeting Password Field 416 with Miranda's preferred "security credential entry area."

At 136 of FIG. 1, the walkthrough is stored in Walkthrough Database 200 of FIG. 2. The walkthrough can then be accessed via a data network, such as the internet, and interacted with by users of Walkthrough Database 200, such as Prospero, by using a computing device.

In some but not all implementations, at 140, a preview of the walkthrough is generated and at 144 a presentation of the preview is provided. The preview can to be accessed via a data network such as the internet and interacted with by a user. By way of example, after the walkthrough is generated, Prospero might click or tap a button in the user interface of his iPad® requesting to view the preview. The walkthrough database system can provide data to Prospero's iPad® which can be processed by a processor of the iPad® to display a presentation of the preview. Prospero can then interact with the preview to validate or modify the walkthrough, as described further below.

In some implementations, a user might view a presentation of a preview and decide to modify a walkthrough. By way of illustration, if Prospero views a preview and notices that some text in the preview is inaccurate, he can request to modify the walkthrough by editing the inaccurate text. The walkthrough can then be modified according to Prospero's request and the modified walkthrough can be stored in Walkthrough Database 200.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
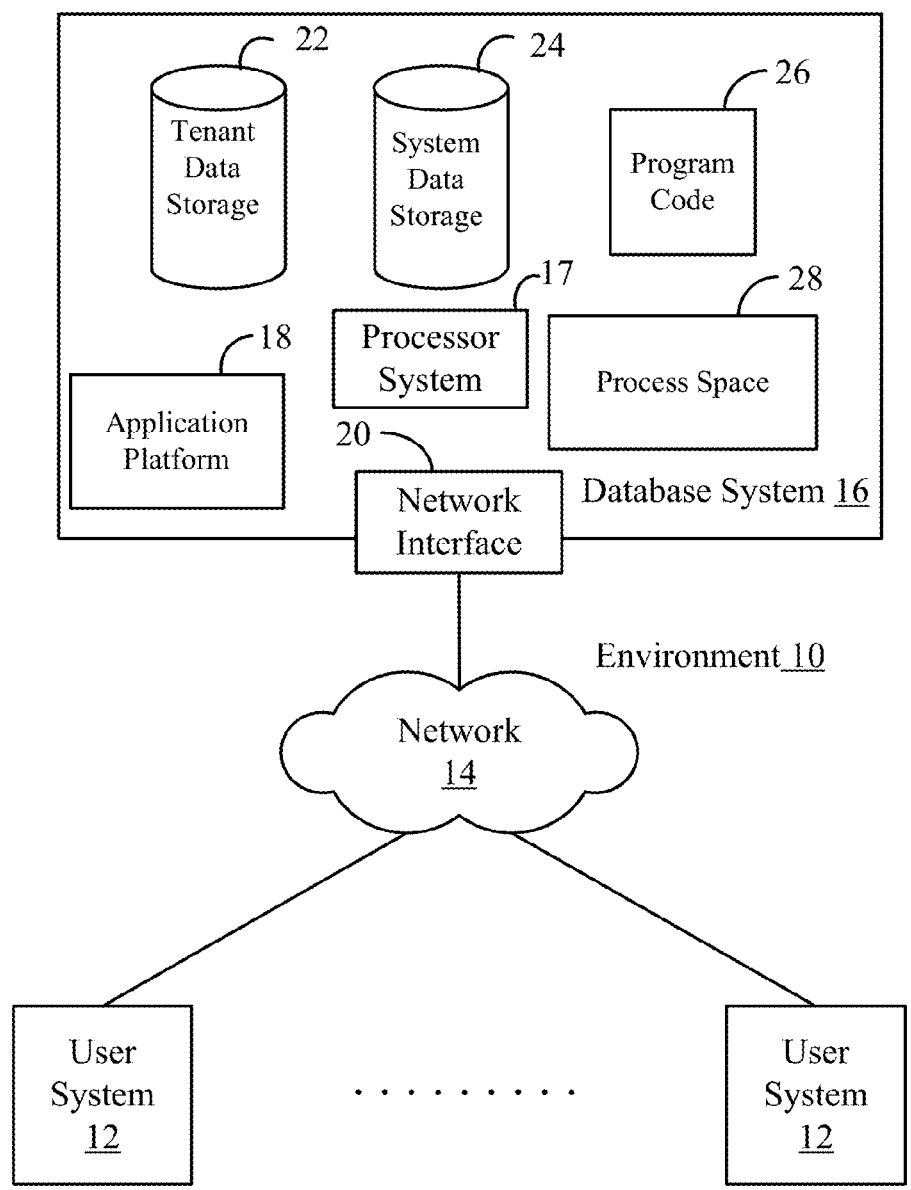
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RD- BMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
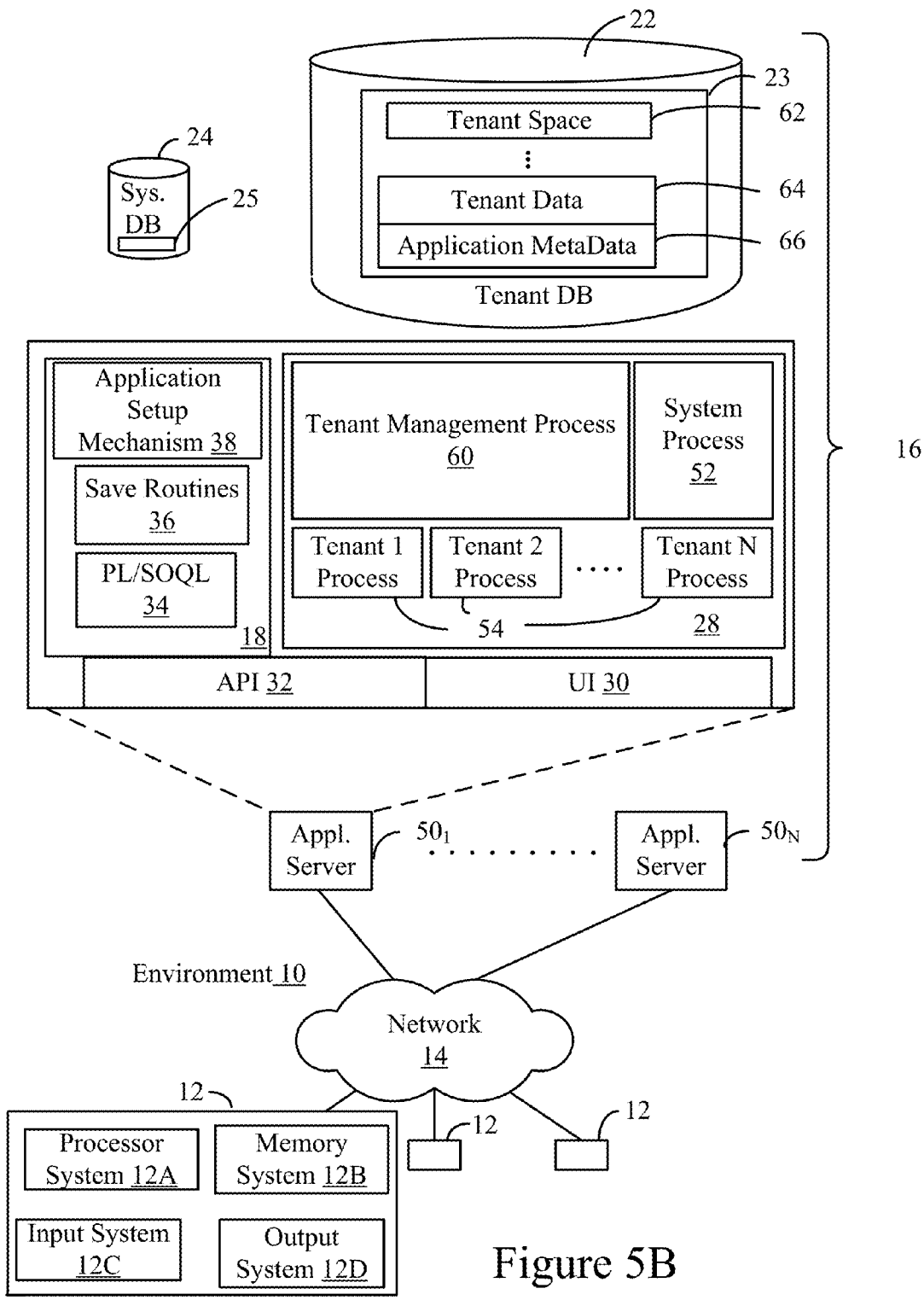
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
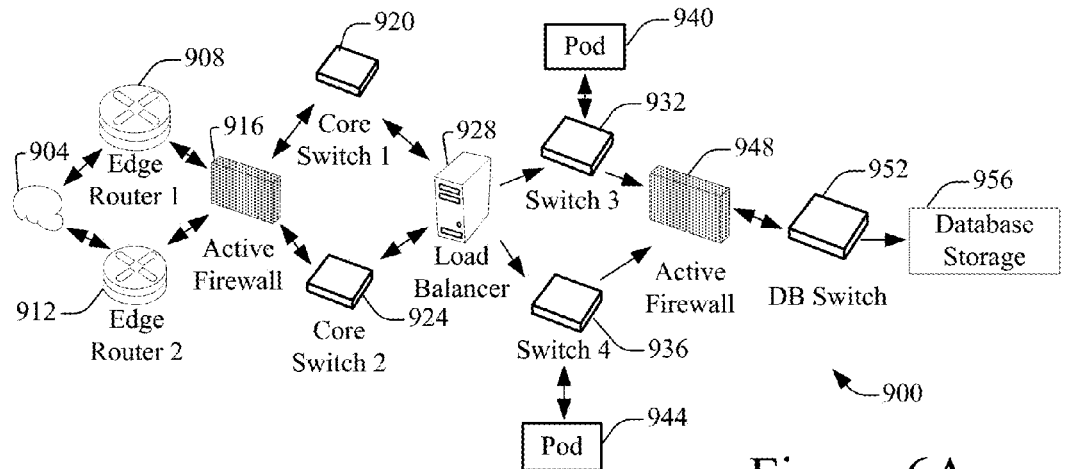
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
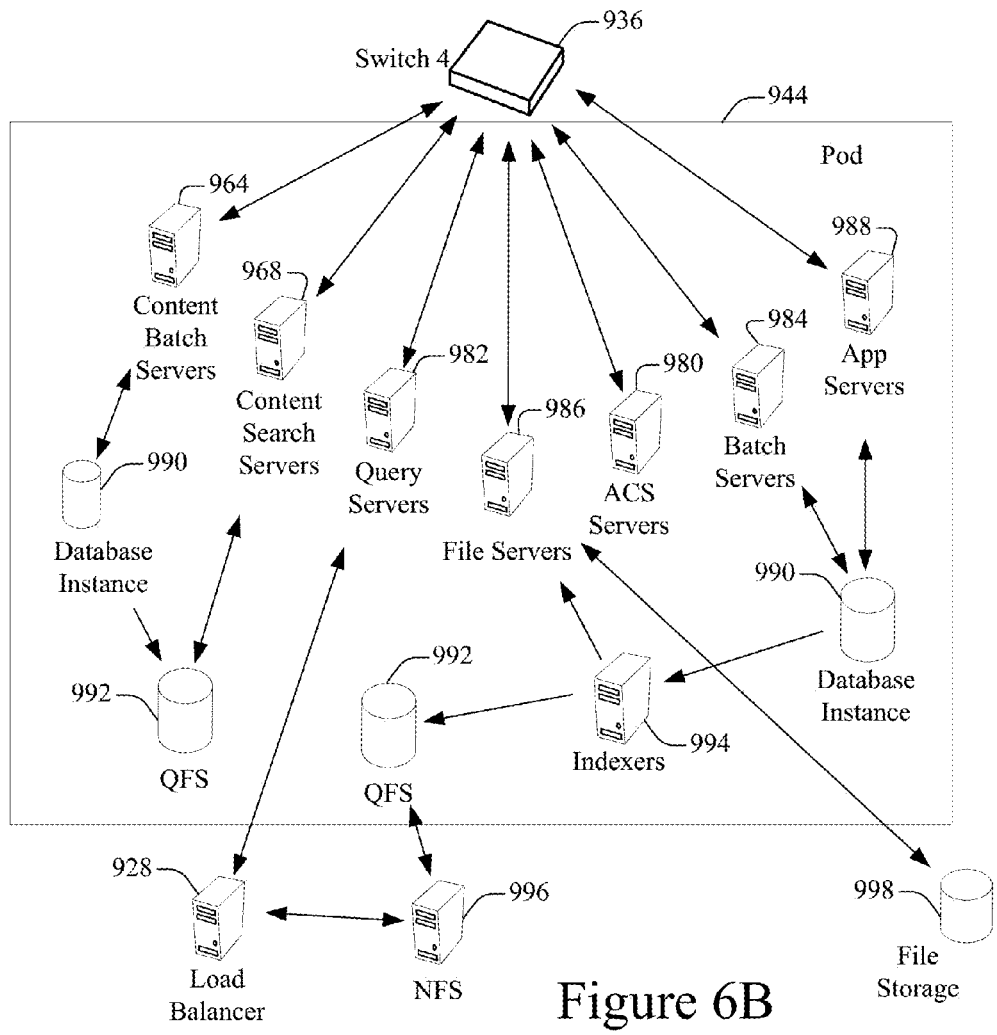
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-4B. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM")

devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
    a database storing data objects indicating walkthrough stages, each walkthrough stage being associated with one or more features of an application or a service provided by one or more servers over a data network; and
    one or more servers in communication with the database, the one or more servers comprising one or more processors operable to cause:
        matching a spatial region of one or more frames of a video to a graphical component of the application or the service to produce a mapping, the video comprising a passive demonstration of the application or the service;
        determining, using the mapping, that an update to a user interface (UI) displayed on a computing device has occurred;
        identifying, based on the UI update, the walkthrough stages;
        assigning the identified walkthrough stages to a walkthrough, the walkthrough comprising a guided exercise configured to provide descriptive content responsive to a user interacting with a feature of the application or the service;
        storing the walkthrough as a data file in a database, the data file configured to be accessed via the data network and interacted with using the computing device;
        processing audio corresponding to the video to obtain a textual representation of the audio;
        parsing the textual representation to obtain a plurality of text portions of the textual representation;
        validating, responsive to a first one or more of the text portions matching one or more keywords characterizing the walkthrough, the identification of the walkthrough stages;
        modifying at least a first stage of the walkthrough to replace a textual item describing the first stage as part of the guided exercise with a second one or more of the text portions;
        determining that a completion criterion of the first stage is satisfied responsive to selection of a target of the first stage;
        determining, responsive to determining satisfaction of the completion criterion of the first stage, that a start criterion of a second stage of the walkthrough is satisfied, the start criterion indicating one or more conditions under which the second stage is displayed; and
        activating, responsive to determining satisfaction of the start criterion of the second stage, the second stage.

2. The system of claim 1, the one or more processors further operable to cause:
    processing the one or more frames, the processing comprising one or more of: identifying a blank frame in the one or more frames, monitoring movement of a cursor, analyzing a Uniform Resource Locator (URL), detecting data entry in a field, or extracting text from the one or more frames using Optical Character Recognition (OCR).

3. The system of claim 1, wherein matching the spatial region of the one or more frames to the graphical component comprises comparing a Document Object Model (DOM) corresponding to the application or the service with the spatial region.

4. The system of claim 3, wherein comparing the DOM corresponding to the application or the service with the spatial region comprises normalizing a position of the spatial region based on one or more of: a designated screen resolution or a designated viewport size.

5. The system of claim 1, wherein determining that the update to the UI has occurred comprises:
    processing a first one of the frames to extract first text from an address bar associated with the application or service, the first text comprising a first URL;
    processing a second one of the frames to extract second text from the address bar associated with the application or service, the second text comprising a second URL; and
    determining that the second text is different from the first text.

6. The system of claim 5, the one or more processors further operable to cause:
    defining or supplementing the walkthrough based on the audio.

7. The system of claim 1, wherein the walkthrough stages are identified based on a designated relationship between the UI update and the walkthrough stages.

8. The system of claim 1, the one or more processors further operable to cause:
    generating a preview of the walkthrough, the preview configured to be accessed via the data network and interacted with using the computing device; and
    providing, to the computing device, data capable of being processed by a processor of the computing device to display a presentation of the preview, the presentation of the preview capable of being interacted with by a user of the computing device to validate or modify the walkthrough.

9. The system of claim 1, the one or more processors further operable to cause:
    processing a request from the computing device to modify the walkthrough;
    causing the walkthrough to be modified according to the request; and
    storing the modified walkthrough as a data file in a database.

10. A method associated with a database storing data objects indicating walkthrough stages, each walkthrough stage being associated with one or more features of an application or a service provided by one or more servers over a data network, the method comprising:
 matching a spatial region of one or more frames of a video to a graphical component of the application or the service to produce a mapping, the video comprising a passive demonstration of the application or the service;
 determining, using the mapping, that an update to a user interface (UI) displayed on a computing device has occurred;
 identifying, based on the UI update, the walkthrough stages;
 assigning the identified walkthrough stages to a walkthrough, the walkthrough comprising a guided exercise configured to provide descriptive content responsive to a user interacting with a feature of the application or the service;
 storing the walkthrough as a data file in a database, the data file configured to be accessed via the data network and interacted with using the computing device;
 processing audio corresponding to the video to obtain a textual representation of the audio;
 parsing the textual representation to obtain a plurality of text portions of the textual representation;
 validating, responsive to a first one or more of the text portions matching one or more keywords characterizing the walkthrough, the identification of the walkthrough stages;
 modifying at least a first stage of the walkthrough to replace a textual item describing the first stage as part of the guided exercise with a second one or more of the text portions;
 determining that a completion criterion of the first stage is satisfied responsive to selection of a target of the first stage;
 determining, responsive to determining satisfaction of the completion criterion of the first stage, that a start criterion of a second stage of the walkthrough is satisfied, the start criterion indicating one or more conditions under which the second stage is displayed; and
 activating, responsive to determining satisfaction of the start criterion of the second stage, the second stage.

11. The method of claim 10, further comprising:
 processing the one or more frames, the processing comprising one or more of: identifying a blank frame in the one or more frames, monitoring movement of a cursor, analyzing a Uniform Resource Locator (URL), or detecting data entry in a field, or extracting text from the one or more frames using Optical Character Recognition (OCR).

12. The method of claim 10, wherein matching the spatial region of the one or more frames to the graphical component comprises comparing a Document Object Model (DOM) corresponding to the application or the service with the spatial region.

13. The method of claim 12, wherein comparing the DOM corresponding to the application or the service with the spatial region comprises normalizing a position of the spatial region based on one or more of: a designated screen resolution or a designated viewport size.

14. The method of claim 10, wherein determining that the update to the UI has occurred comprises:
 processing a first one of the frames to extract first text from an address bar associated with the application or service, the first text comprising a first URL;
 processing a second one of the frames to extract second text from the address bar associated with the application or service, the second text comprising a second URL; and
 determining that the second text is different from the first text.

15. The method of claim 14, further comprising:
 defining or supplementing the walkthrough based on the audio.

16. A non-transitory computer-readable medium associated with a database storing data objects indicating walkthrough stages, each walkthrough stage being associated with one or more features of an application or a service provided by one or more servers over a data network, the non-transitory computer readable medium comprising computer-readable program code to be executed by one or more processors when retrieved from the non-transitory computer-readable medium, the program code comprising instructions configured to cause:
 matching a spatial region of one or more frames of a video to a graphical component of the application or the service to produce a mapping, the video comprising a passive demonstration of the application or the service;
 determining, using the mapping, that an update to a user interface (UI) displayed on a computing device has occurred;
 identifying, based on the UI update, the walkthrough stages;
 assigning the identified walkthrough stages to a walkthrough, the walkthrough comprising a guided exercise configured to provide descriptive content responsive to a user interacting with a feature of the application or the service;
 storing the walkthrough as a data file in a database, the data file configured to be accessed via the data network and interacted with using the computing device;
 processing audio corresponding to the video to obtain a textual representation of the audio;
 parsing the textual representation to obtain a plurality of text portions of the textual representation;
 validating, responsive to a first one or more of the text portions matching one or more keywords characterizing the walkthrough, the identification of the walkthrough stages;
 modifying at least a first stage of the walkthrough to replace a textual item describing the first stage as part of the guided exercise with a second one or more of the text portions;
 determining that a completion criterion of the first stage is satisfied responsive to selection of a target of the first stage;
 determining, responsive to determining satisfaction of the completion criterion of the first stage, that a start criterion of a second stage of the walkthrough is satisfied, the start criterion indicating one or more conditions under which the second stage is displayed; and
 activating, responsive to determining satisfaction of the start criterion of the second stage, the second stage.

17. The non-transitory computer-readable medium of claim 16, the instructions further configured to cause:
 processing the one or more frames, the processing comprising one or more of: identifying a blank frame in the one or more frames, monitoring movement of a cursor, analyzing a Uniform Resource Locator (URL), or detecting data entry in a field, or extracting text from the one or more frames using Optical Character Recognition (OCR).

18. The non-transitory computer-readable medium of claim 16, wherein matching the spatial region of the one or more frames to the graphical component comprises comparing a Document Object Model (DOM) corresponding to the application or the service with the spatial region.

19. The non-transitory computer-readable medium of claim 18, wherein comparing the DOM corresponding to the application or the service with the spatial region comprises normalizing a position of the spatial region based on one or more of: a designated screen resolution or a designated viewport size.

20. The non-transitory computer-readable medium of claim 16, wherein determining that the update to the UI has occurred comprises:
   processing a first one of the frames to extract first text from an address bar associated with the application or service, the first text comprising a first URL;
   processing a second one of the frames to extract second text from the address bar associated with the application or service, the second text comprising a second URL; and
   determining that the second text is different from the first text.

\* \* \* \* \*